(12) United States Patent
Rouson (10) Patent No.: US 8,010,943 B2
(45) Date of Patent: Aug. 30, 2011

(54) DYNAMIC MEMORY MANAGEMENT SYSTEM AND METHOD

(75) Inventor: Damian Rouson, Berkeley, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1019 days.

(21) Appl. No.: 11/855,403

(22) Filed: Sep. 14, 2007

(65) Prior Publication Data

US 2008/0301163 A1 Dec. 4, 2008

Related U.S. Application Data

(60) Provisional application No. 60/941,319, filed on Jun. 1, 2007.

(51) Int. Cl.
*G06F 9/44* (2006.01)
(52) U.S. Cl. ........... 717/114; 717/120; 717/127; 706/62
(58) Field of Classification Search .......... 717/114–135; 707/661, 692, 792; 706/62
See application file for complete search history.

(56) References Cited

U.S. PATENT DOCUMENTS

| 5,341,483 | A | * | 8/1994 | Frank et al. | 711/206 |
|---|---|---|---|---|---|
| 6,421,690 | B1 | * | 7/2002 | Kirk, III | 1/1 |
| 6,728,953 | B1 | * | 4/2004 | Walster | 717/151 |
| 7,093,231 | B2 | * | 8/2006 | Nuss | 717/114 |
| 7,814,462 | B2 | * | 10/2010 | Husbands et al. | 717/119 |
| 2007/0294682 | A1 | * | 12/2007 | Demetriou et al. | 717/153 |
| 2008/0307174 | A1 | * | 12/2008 | Garst et al. | 711/160 |

OTHER PUBLICATIONS

D. Walker et al.; Alias types for recursive data structures; 2001—Springer; pp. 1-17.*
W. Robertson et al.; Run-time detection of heap-based overflows; 2003—usenix.org; pp. 1-15.*
A. Iyengar et al.; Design and performance of a general-purpose software cache; IEEE International, 1998—ieeexplore.ieee.org; pp. 1-8.*
Markus, A., Avoiding memory leaks with derived types ACM Fortran Forum 22(2) (Aug. 2003), pp. 1-6.
Rouson, D.W.I., Morris, K., and Xu, X., Dynamic memory de-allocation in Fortran 95/2003 derived type calculus, scientific Programming 13(3) (2005), pp. 189-203.
Stewart, G.W., Memory leaks in derived types revisited, ACM Fortran forum 22(3) (Dec. 2003), pp. 25-27.

* cited by examiner

*Primary Examiner* — Wei Zhen
*Assistant Examiner* — Satish Rampuria
(74) *Attorney, Agent, or Firm* — Suresh Koshy; Amy Ressing (57) ABSTRACT

A data expression is created to be executed on a computer. At least one of the at least two objects is tagged as temporary. A first non-assignment operator is executed to instruct the computer to perform a mathematical operation on object data corresponding to the one of the at least two objects and thereby creating resultant object data corresponding to the one of the at least two objects. The object data corresponding to the one of the at least two objects is overwritten with the resultant object data corresponding to the one of the at least two objects. A first assignment operator is executed to instruct the computer to assign the one of the at least two objects to the second of the at least two objects thereby copying correspondence of the resultant object data to the second of the at least two objects. The overwriting is performed after the executing a first non-assignment operator and prior to the executing a first assignment operator.

3 Claims, 5 Drawing Sheets

Array<type>

+ dimension : integer

+ size( Array<type> ) : integer
+ shape( Array<type> ) : Array<type>(dimension)
+ allocated( Array<type> ) : Boolean

FIG. 3

| Field | |
|---|---|
| -N : integer<br>-fourier : Array<complex>(N/2,N,N)<br>-physical : Array<real>(N,N,N)<br>-temporary : Boolean | + Field_(Array<real>(N,N,N))<br>+ delete_Field( Field )<br>+ d_dx(Field) : Field<br>+ operator(+)(Field,Field) : Field<br>+ operator(*)(real,Field) : Field<br>+ assignment(=)(Field,Field) |

DYNAMIC MEMORY MANAGEMENT SYSTEM AND METHOD

CROSS-REFERENCE TO RELATED APPLICATIONS

This application claims the benefit of priority under 35 U.S.C. §119(e) to provisional U.S. Patent Application Ser. No. 60/941,319, entitled "DYNAMIC MEMORY MANAGEMENT SYSTEM AND METHOD," to Damian Rouson.

TECHNICAL FIELD

The present invention relates generally to a method and system of memory management, and more particularly to a method and system of memory management for overloaded operations in a programming language.

BACKGROUND ART

Formal methods form an important branch of software engineering that has apparently been applied to the design of only a small percentage of scientific simulation programs. Two pillars of formalization are specification and verification—that is specifying mathematically what a program must do and verifying the correctness of an algorithm with respect to the specification. The numerical aspects of scientific programming are already formal. The mathematical equations one wishes to solve in a given scientific simulation provide a formal specification, while a proof of numerical convergence provides a formal verification. Hence, formal methods developers often cite a motivation of seeking correctness standards for non-scientific codes as rigorous as those for scientific codes. This ignores, however, the non-numerical aspects of scientific programs that could benefit from greater rigor. One such aspect is memory management.

There have been longstanding calls for increased use of formal methods in scientific programming to improve reliability. Examples of serious common faults include interface inconsistencies and using un-initialized variables.

Adoption of formal methods in scientific simulation has been predicted to be slow because of the requisite mathematical training, which often includes set theory and a predicate calculus. A good candidate for adoption must balance such rigor with ease of use. The Object Constraint Language (OCL) strikes such a balance by facilitating the expression of formal statements about software models without the use of mathematical symbols known only to formal methods specialists. A primary requirement stated by OCL's designers is that OCL must be understood by people who are not mathematicians or computer scientists.

To attract scientific programmers, any software development strategy must address performance. Fortunately, program specification and verification are part of the software design rather than the implementation. Thus, they need not impact run-time performance. However, run-time checking of assertions, a third pillar of formal methods, is part of the implementation. Nonetheless, when the assertions are simple Boolean expressions, they often occupy a negligible fraction of the run time compared to the long loops over millions of floating point calculations typical of scientific software.

A final factor influencing adoption of formal methods is the lack of a common approach for describing the structure of traditional scientific codes beyond flow charts. OCL's incorporation into the recent versions of the Unified Modeling Language (UML), a graphical standard for describing software structure and behavior, suggests that newcomers must simultaneously leap two hurdles: learning OCL and learning UML. Fortunately, increasing interest in object-oriented scientific programming has led to more frequent scientific program structural descriptions resembling UML class models. Class models describe object interfaces and relationships between classes. Object interfaces describe object behavior (procedures) and state (data).

The coupling of OCL and UML class models represents a subtle yet important shift away from the traditional emphases of scientific programming. Traditional approaches develop mathematical abstractions for the physics and the numerics but not the software. For example, continuum mechanics is an abstraction of condensed matter in that it retains only the level of detail required to model macroscopic phenomena. Numerical approximations represent an abstraction of the governing continuum equations in that they retain only the number of discrete values required to obtain a solution within a given tolerance. Likewise, UML class models are software abstractions that retain only the features needed to describe object interfaces and their interrelationships. OCL facilitates describing the resulting software model formally.

DISCLOSURE OF THE INVENTION

An embodiment of the invention, for example, demonstrates how exposure to formal methods provides a systematic approach to run-time assertion checking.

An embodiment of the invention, for example, demonstrates an increase in code readability achieved through use of pointers, an otherwise language-specific construct.

An embodiment of the invention includes a method of managing data in a data expression to be executed on a computer. The data expression includes at least two overloaded operators and at least two objects. The at least two overloaded operators have at least two instructions, respectively. The at least two objects have at least two object data, respectively. The at least two objects include at least one original object and at least one resultant object. The at least two overloaded operators include an assignment operator and a non-assignment operator. Each assignment operator is capable of instructing the computer to assign a first of the at least two objects to a second of the at least two objects. Each non-assignment operator is capable of instructing the computer to perform a mathematical operation on one of the at least two objects. Each of the at least two overloaded operators is operable to map at least one of the at least two objects to a respective one of the at least one resultant objects. A data expression is created to be executed on a computer. At least one of the at least two objects is tagged as temporary. A first non-assignment operator is executed to instruct the computer to perform a mathematical operation on object data corresponding to the one of the at least two objects and thereby creating resultant object data corresponding to the one of the at least two objects. The object data corresponding to the one of the at least two objects is overwritten with the resultant object data corresponding to the one of the at least two objects. A first assignment operator is executed to instruct the computer to assign the one of the at least two objects to the second of the at least two objects thereby copying correspondence of the resultant object data to the second of the at least two objects. The overwriting is performed after the executing a first non-assignment operator and prior to the executing a first assignment operator. Optionally, memory corresponding to the object data that corresponds to the one of the at least two objects is de-allocated.

Another embodiment of the invention includes a method of managing data in a data expression to be executed on a computer. The data expression includes at least two overloaded operators and at least two objects. The at least two overloaded operators has at least two instructions, respectively. The at least two objects has at least two object data, respectively. The at least two objects include at least one original object and at least one resultant object. The at least two overloaded operators includes an assignment operator and a non-assignment operator. Each assignment operator is capable of instructing the computer to assign a first of the at least two objects to a second of the at least two objects. Each non-assignment operator is capable of instructing the computer to perform a mathematical operation on one of the at least two objects. Each of the at least two overloaded operators is operable to map at least one of the at least two objects to a respective one of the at least one resultant objects. A data expression is created to be executed on a computer. At least one of the at least two objects is tagged as temporary. A first non-assignment operator is executed to instruct the computer to perform a mathematical operation on object data corresponding to the one of the at least two objects and thereby creating resultant object data corresponding to the one of the at least two objects. Memory corresponding to the object data that corresponds to the one of the at least two objects is de-allocated. A first assignment operator is executed to instruct the computer to assign the one of the at least two objects to the second of the at least two objects thereby copying correspondence of the resultant object data to the second of the at least two objects. The de-allocating is performed after the executing a first non-assignment operator and prior to the executing a first assignment operator.

BEST MODES OF CARRYING OUT THE INVENTION

In an embodiment of the invention, an operator is a procedure that takes on one or two arguments, returns one result, and can be referenced by writing the operator adjacent to its argument(s). For example, if the expressions -a; and a-b refer to procedures that take one and two arguments respectively (a in the first case, and a and b in the second case), and returns the negation of a (in the first case) and the difference between a and b (in the second case), then "-" is an operator.

An assignment operator takes two arguments, for example, c and d in the expression c=d returns its result inside the c argument. By way of contrast, a non-assignment operator would return the result inside a data structure with a new name or memory referenced by a new name. Suppose a user would like to instruct a computer to perform the data expression: E=-F; i.e., multiply the value of F by negative one, and assign the resultant product to the value E. This function includes two objects, E and F, and two operators, multiply and assign. The "equals" or assign operator may be referred to an assignment operator, whereas the "multiply" operator may be referred to as a non-assignment operator. In other words, any operator, e.g., multiply, divide, add, subtract, transform, etc., are non-assignment operators, whereas "equals" are assignment operators.

In operator overloading, a programmer writes a definition for the application of an intrinsic or built-in operator to arguments of a non-intrinsic or programmer-defined data type. Such a definition comprises a procedure and its interface. Using Fortran 95 and Fortran 2003 as illustrative tools, the programmer who has defined a data type foo containing one floating point component bar as follows:

```
TYPE foo
    REAL :: bar
END TYPE foo
``` can then provide the following interface that overloads an addition operator by declaring that references to that addition operator can be resolved or translated to calls to a function "plus" as follows:

```
INTERFACE OPERATOR(+)
    MODULE PROCEDURE plus
END INTERFACE OPERATOR(+).
```

The programmer must then provide a procedure definition such as

```
FUNCTION plus(lhs, rhs) RESULT(sum)
    REAL, INTENT(IN) :: lhs, rhs
    REAL            :: sum
    sum%bar = lhs%bar + rhs%bar
END FUNCTION plus
``` which can later be accessed in executable instructions of the form

TYPE(foo)::a,b,c $c=a+b$ resulting in a call equivalent to c=plus(a, b).

In view of the above, a central activity in object-oriented software design involves constructing abstract data types (ADTs) appropriate for a given application domain. In computational science and engineering (CS&E), these ADTs often represent physical entities whose state variables admit a standard calculus. One typically uses this calculus to formulate differential equations that govern the system dynamics. Implementing the associated algebraic and differential operators in a high-level language facilitates semantics mimicking standard mathematical notation. As the formulas expressed become increasingly complicated, one frequently finds the need to allocate temporary storage for intermediate results. To avoid memory leaks, a strategy must be adopted for de-allocating storage once it is no longer needed. As with any task performed ubiquitously in a given application domain, one expects common idioms to arise for expressing the associated algorithms. Since the addition of dynamic memory management to Fortran lagged that of many other popular languages, there has been less time for such algorithms and idioms to be promulgated.

The Fortran 95 standard provided numerous constructs useful in creating ADTs. These include modules, derived types and private data. ADTs can be implemented in Fortran 95 as modules that encapsulate derived types with public procedures for operating on the types' private data. Operator overloading facilitates performing arithmetic on the derived types. Generic function interfaces (module procedures) facilitate generalizing that arithmetic to a more feature-rich calculus with polymorphic integration and differentiation functions. These functions are referred to herein as differential operators by analogy with the mathematical operators they implement.

When overloaded arithmetic and differential operators are strung together in a single expression, the call tree follows a pattern wherein the result of each operator of higher precedence gets passed up the call tree to an operator of lower precedence, typically terminating with a call to the assignment operator. Each operator result is an instance of the given derived type. The memory that must be allocated for each result falls into two categories: derived type components whose size can be determined at compile-time and those whose size must be determined at run-time.

The Fortran 95 standard provided only one mechanism for derived type components whose memory requirements are not known at compile-time. That mechanism was pointer components. Given the havoc pointers potentially wreak on optimizing compilers and the resulting performance penalty, this mechanism offered limited utility for the class of CS&E programs in which long loops over fine-grained data objects form the dominant activity. This deficiency was recognized soon after the publication of the Fortran 95 standard, and the standards committee promised in a 1998 technical report to include allocatable components in derived types in its next standard. Allocatable components are now officially a feature of Fortran 2003.

An exemplary embodiment of the invention includes method of managing data in a data expression to be executed on a computer. The data expression includes at least two operators and at least two objects. The operators have at least two instructions, respectively, whereas the objects have at least two object data, respectively. The objects include at least one original object and at least one resultant object. The operators include an assignment operator and a non-assignment operator. Each assignment operator is capable of instructing the computer to assign a first object to a second object. Each non-assignment operator is capable of instructing the computer to perform a mathematical operation on one of the objects. Each of the operators is operable to map at least one of the objects to a respective one of the resultant objects. The method comprises creating a data expression to be executed on a computer, tagging at least one of the two original objects as temporary, executing a first non-assignment operator, executing an assignment operator and overwriting the temporary original object with the resultant object, i.e., the result of the assignment operator. The executing of the first non-assignment operation instructs the computer to perform a mathematical operation on the one of the objects and thereby creates resultant object data. The executing of the assignment operator instructs the computer to assign the one of the objects to a second object thereby copying correspondence of the resultant object data to the second object. The overwriting includes overwriting the resultant object data.

By way of example, consider the data expression: A=−B. B is the original object. A non-assignment operator minus(B) returns a temporary resultant object. An assignment operator assign(A, . . . ) returns a final resultant object, which overwrites the temporary resultant object.

In an alternative embodiment of the invention, memory corresponding to the object data that corresponds to the one of the at least two objects is de-allocated. For example, the de-allocating is performed after the executing a first non-assignment operator and prior to the executing a first assignment operator.

By way of example, consider the data expression: A=−B. B is the original object. A non-assignment operator minus(B) returns a temporary resultant object. An assignment operator assign(A, . . . ) returns a final resultant object. The temporary resultant object is de-allocated.

Figure 1:
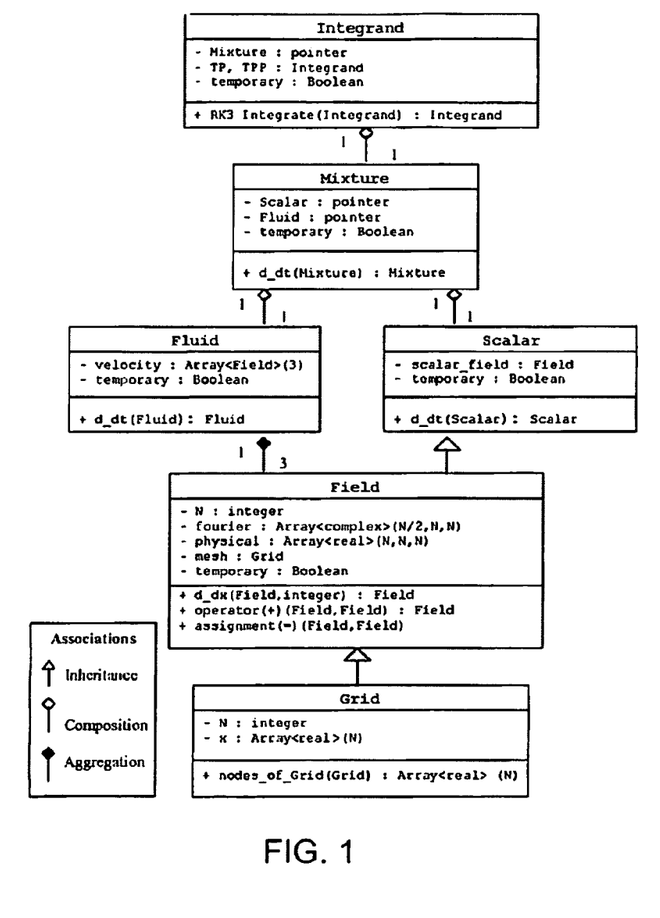
FIG. 1 is an example of a Navier-Stokes fluid and scalar advection/diffusion class model, wherein numbers near associations indicate the number of instantiations present on either side of the association.

Another embodiment of the invention is described as follows. OCL constraints are meaningful only in the context of an object-oriented class model. FIG. 1 presents a UML class model for a scalar advection/diffusion solver. The random molecular diffusion and organized transport (advection) of scalar quantities is of broad scientific interest. Applications range from modeling combustion to tracking atmospheric pollutants. For ease of understanding, an embodiment of the invention is discussed below, wherein the scalar is temperature and the resulting scalar advection and diffusion are thermal convection and conduction, respectively. But, it should be understood that other embodiments of the invention exist for alternative applications.

FIG. 1 depicts three types of relationships between classes: inheritance, composition and aggregation. Inheritance relationships are one-to-one associations referred to as "is a" relationships. Composition represents a "contains a" relationship wherein the contained object survives if the containing object ceases to exist. Aggregation represents a "has a" relationship wherein each instance of a class includes one or more instances of another class that does not survive if the including object ceases to exist. Thus, FIG. 1 reads as follows: an Integrand contains a Mixture that contains a Fluid and a Scalar; whereas a Fluid has three Fields (velocity components), a Scalar is a Field, and a Field is a Grid with an associated set of values. The Integrand uses Mixture time derivatives to integrate the Mixture forward in time. The Mixture time derivative is the vector containing its component Scalar and Fluid time derivatives. The Fluid time derivative is calculated from Navier-Stokes equations. The Scalar time derivative is calculated from the thermal conduction/convection equation described below. The Grid holds mesh positions and connectivity. The Mixture mediates information exchange between the Scalar and Fluid to avoid the circular reference that would result from making the Scalar and Fluid aware of each other.

A scalar temperature field, T(x,y,z,t), in a homogeneous fluid medium satisfies the following advection/diffusion relation, also referred to as the "energy equation":

$$\frac{\partial T}{\partial t} = \frac{1}{\alpha}\left(\frac{\partial^2 T}{\partial x^2} + \frac{\partial^2 T}{\partial y^2} + \frac{\partial^2 T}{\partial z^2}\right) - \left(u\frac{\partial T}{\partial x} + v\frac{\partial T}{\partial y} + w\frac{\partial T}{\partial z}\right) \quad \text{Eq. (1)}$$

where $u=(u,v,w)^1$ is the Fluid velocity field and $\alpha$ is the thermal diffusivity. The first parenthetical terms on the right-hand side (RHS) of Eq. (1) model thermal diffusion, which is energy transport by random molecular motions. The second parenthetical terms model thermal advection, or "convection", which is energy transport by organized motions (fluid flow). The operators required to evaluate the RHS of Eq. (1) include the arithmetic operators x, +, and −, the differential operators ∂/∂x, ∂/∂y, and ∂/∂z and combinations thereof. For example, the Fortran 95 or Fortran 2003 source code is as follows:

$$dT\_dt=(1/alpha)*(d2\_dx2(T,1)+d2\_dx2(T,2)+d2\_dx2(T,3))\&-(u*d\_dx(T,1))+v*d\_dx(T,2))+w*d\_dx(T,3)),$$

wherein "&" is a continuation character joining the previous two lines.

Figure 2:
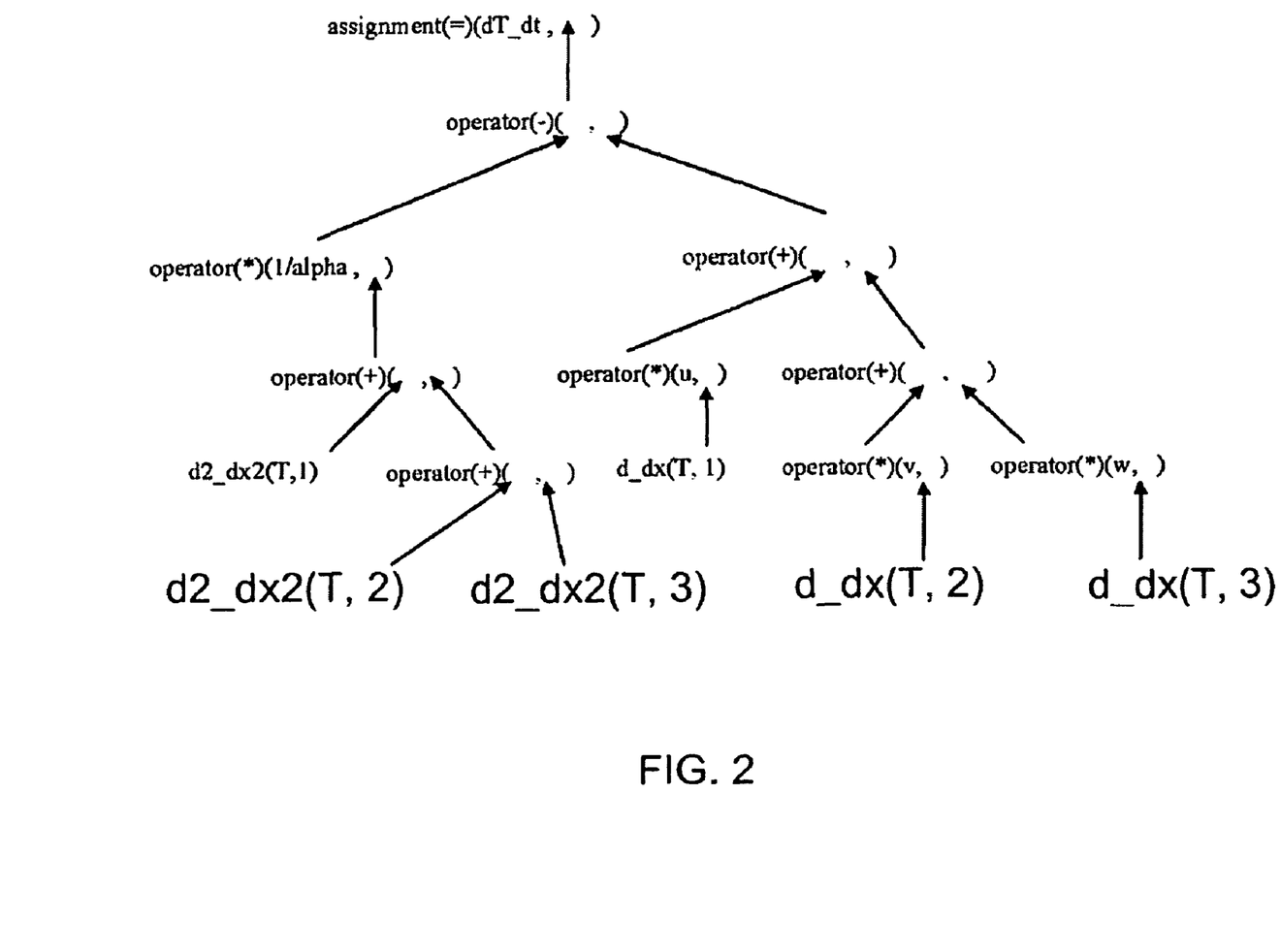
FIG. 2 is an example of a call tree.

For such source code, FIG. 2 shows resulting call tree for evaluating the RHS of Eq. (1).

D. W. I. Rouson et al., Dynamic Memory De-allocation in Fortran 95/2003 Derived Type Calculus, Scientific Programming 13(3) 2005, ("RMX") incorporated herein by reference, discusses informal memory management rules for using the Integrand class to integrate the time derivative on the left-hand side of evolutions equations such as Eq. (1). specification in any natural language such as English is inherently informal due to the ambiguities associated with such languages. Evaluation of the right-hand side of Eq. (1) is discussed as follows in light of increased memory requirements of 3D fields.

Each procedure call in FIG. 2 produces a Field result that is no longer needed once the operator of lower precedence (higher on the call tree) completes. Thus, FIG. 2 represents 15 intermediate instantiations. Each intermediate result is an instance of the Scalar class containing its own Field representation. Simulating turbulent flows at laboratory conditions requires discrete fields with roughly $512^3$ grid points. With 4-byte precision per value, each Field instance occupies 0.5 gigabytes. If compilers do not deallocate the intermediate results, the burden falls on the programmer to do so. When the final assignment at the top of the call tree is executed, the names associated with intermediate allocations are out of scope and it would be difficult or impossible for the programmer to free the associated memory at that point. RMX discussed the following definitions and rules for freeing the memory allocated by each overloaded operator in Fortran 95 and Fortran 2003:

Definition 1. Given an object that appears as the result of an arithmetic or differential operator, we define the object as temporary if it can be deleted at the termination of execution of the first subsequent operator in which it appears as an argument.

Corollary: All objects that are not temporary are persistent.

RMX implemented this scheme by inserting Boolean (Fortran LOGICAL) flags named temporary in the definition of each data structure. They then applied four rules to memory allocations and de-allocations:

Rule 1: All arithmetic and differential operator results are marked as temporary upon creation.

Rule 2: Left-hand arguments to defined assignments are marked as persistent, wherein Fortran refers to overloaded assignment operators as "defined assignments."

Rule 3: Temporary objects are deleted prior to the termination of any arithmetic or differential operator in which they appear as an argument.

Rule 4; Persistent objects are deleted prior to the termination of the procedure that instantiated them.

Before explaining how formalizing these rules is useful in an embodiment of the instant invention, specification issues in OCL and implementation issues in Fortran are discussed as follows.

Figure 3:
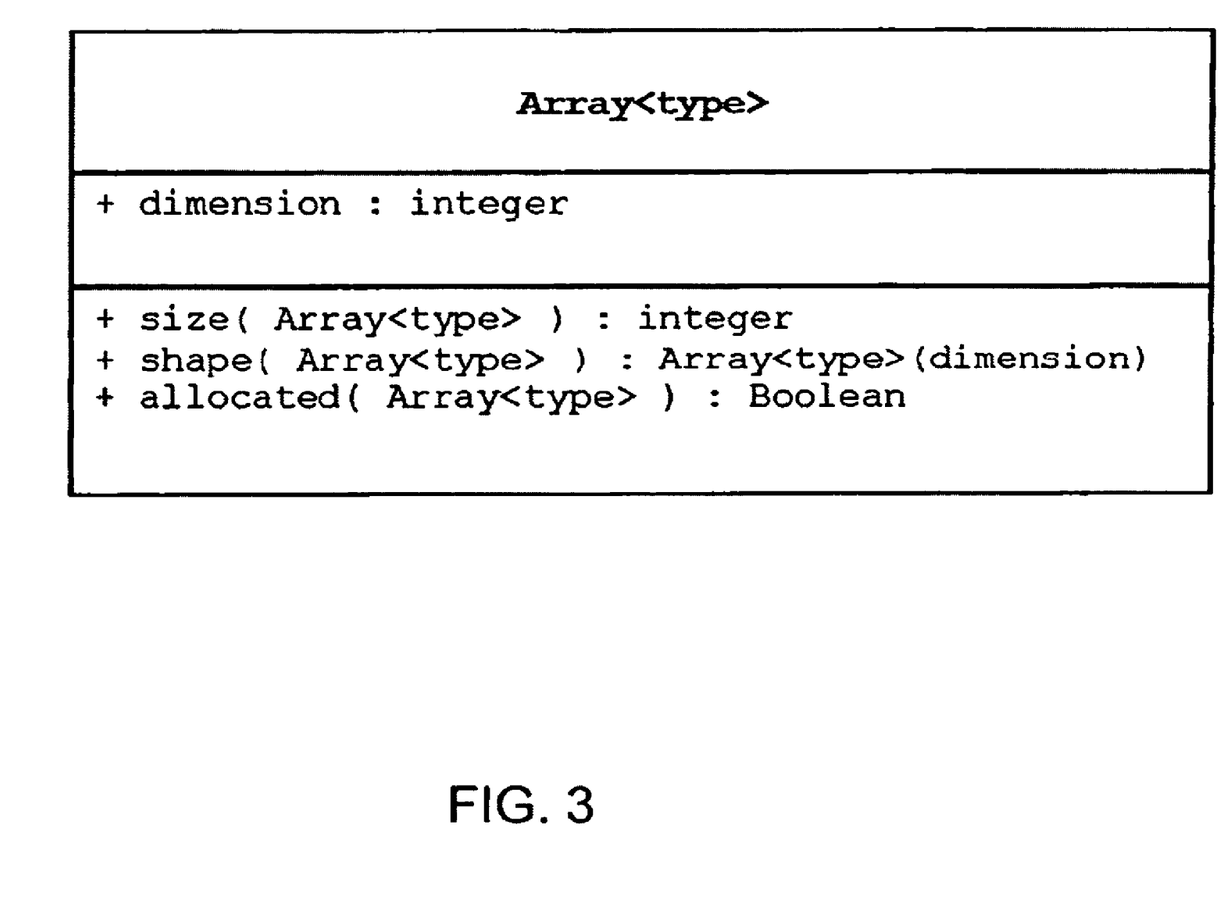
FIG. 3 is an example of a utility array class template.

Multidimensional arrays account for the lion's share of the memory allocated in a Field implementation. Although OCL has a "sequence" type that could naturally be used to model one-dimensional arrays, OCL does not contain an intrinsic multidimensional array type. Any types defined by a UML model, however, are considered OCL model types. The user is assumed to have access to a multidimensional utility array class template for constructing collections of various basic types and model types. FIG. 3 depicts, by way of example, one such template. The available array class is assumed to implement the attributes and services of the Fortran 95 and Fortran 2003 arrays. In particular, the class should have public methods that return the array size, shape, and allocation status as shown in FIG. 3.

Although OCL is programming language-independent, it will prove fruitful to discuss programming language characteristics amenable for use with the instant invention. Factors for choosing an acceptable language for use in an embodiment of the instant invention, e.g., Fortran 95 and Fortran 2003, include the language's operator overloading ability and ability to allocate and de-allocate memory dynamically.

To provide the requisite operators, overloaded operators of the following form are defined:

```
PRIVATE ! hide all data & procedures by default
PUBLIC :: OPERATOR (+), Field
INTERFACE OPERATOR (+)
    MODULE PROCEDURE field_plus_field
END INTERFACE OPERATOR (+)
``` where the exclamation marks precede comment. The above syntax tells the compiler to call field_plus_field( ) whenever it finds the "+" operator between two objects that match the argument list in the following function signature:

```
FUNCTION field_plus_field (left, right) RESULT (total)
TYPE (Field), INTENT (IN) :: left, right
TYPE (Field) :: total
```

The above function returns the pointwise sum of two instances of the following derived type:

```
TYPE Field
    PRIVATE
        REAL, DIMENSION (:,:,:), ALLOCATABLE :: physical
        COMPLEX, DIMENSION (:, :, :), ALLOCATABLE :: fourier
        TYPE (Grid) :: mesh
        LOGICAL :: temporary
END TYPE Field
``` where Fortran keywords are capitalized as a visual cue to code structure and where the components of a Field are its physical-space samples, the corresponding Fourier-space coefficients, the mesh point locations of the physical-space samples, and a Boolean indicator of whether the given Field object is temporary or persistent.

The Fortran 95 and Fortran 2003 standards require overloaded operators and the procedures they call to be free of side effects. That is, they cannot modify their arguments. The "INTENT(IN)" attribute enforces this condition, but also poses a memory management dilemma. In composite (nested) function calls, the left and right arguments could have appeared as a RESULT in an operator of higher precedence. The operator passing its result to field_plus_field is likely to have allocated memory for that result's fourier or physical component just as field_plus_field will likely need to allocate space for total % fourier or total % physical via a statement of the form ALLOCATE(total%physical(nx,ny,nz))

where nx, ny, and nz are integers. The easiest and most efficient place for the programmer to release memory that was dynamically allocated inside the result of one operator is inside the operator to which this result is passed. However, the operator receiving the result cannot modify it. A similar dilemma relates to defined assignments such as PUBLIC :: ASSIGNMENT (=)
    INTERFACE ASSIGNMENT (=)
       MODULE PROCEDURE field_equals_field
    END INTERFACE ASSIGNMENT (=)
    SUBROUTINE field_equals_field (left, right)
       TYPE (Field), INTENT (OUT) :: left
       TYPE (Field), INTENT (IN) :: right where there frequently arises a need to free memory associated with allocatable components of right if it is the result an expression evaluation. The Fortran standard resolves the above dilemmas by stipulating, "When a variable of derived type is deallocated, any ultimate component that is a currently allocated allocatable array is deallocated (as if by a DEALLOCATE statement)." Since the compiler is responsible for deallocating left and right after they go out of scope, the standard obligates compilers to deallocate these variables' allocatable components also. However, some compilers exhibit memory leaks for at least some overloaded expressions.

Even compilers that do the proper deallocations might not do so economically. For example, we have analyzed intermediate code received from the Numerical Algorithms Group (NAG) and found that the NAG compiler carries along all the memory allocated at intermediate steps in the call tree, performing deallocations only after the final assignment at the top of the tree. This extremely lax, although arguably valid, interpretation of the standard could lead programmers working with large arrays to abandon operator overloading until the situation improves.

An embodiment of the invention facilitates the use of allocatable components. An embodiment of the invention economizes the dynamic memory usage in ways the standard does not require. Achieving these goals requires addressing widespread and longstanding inadequacies in compilers, not inadequacies in the standard.

Constraints that preclude a category of memory leaks in composite operator calls are discussed illustratively as follows. Leak-free execution is referred to herein as hermetic memory management, or simply hermeticity. The memory of interest is associated with the allocatable array components inside data structures passed into, through and out of call trees of the form of FIG. 2.

Figure 4:
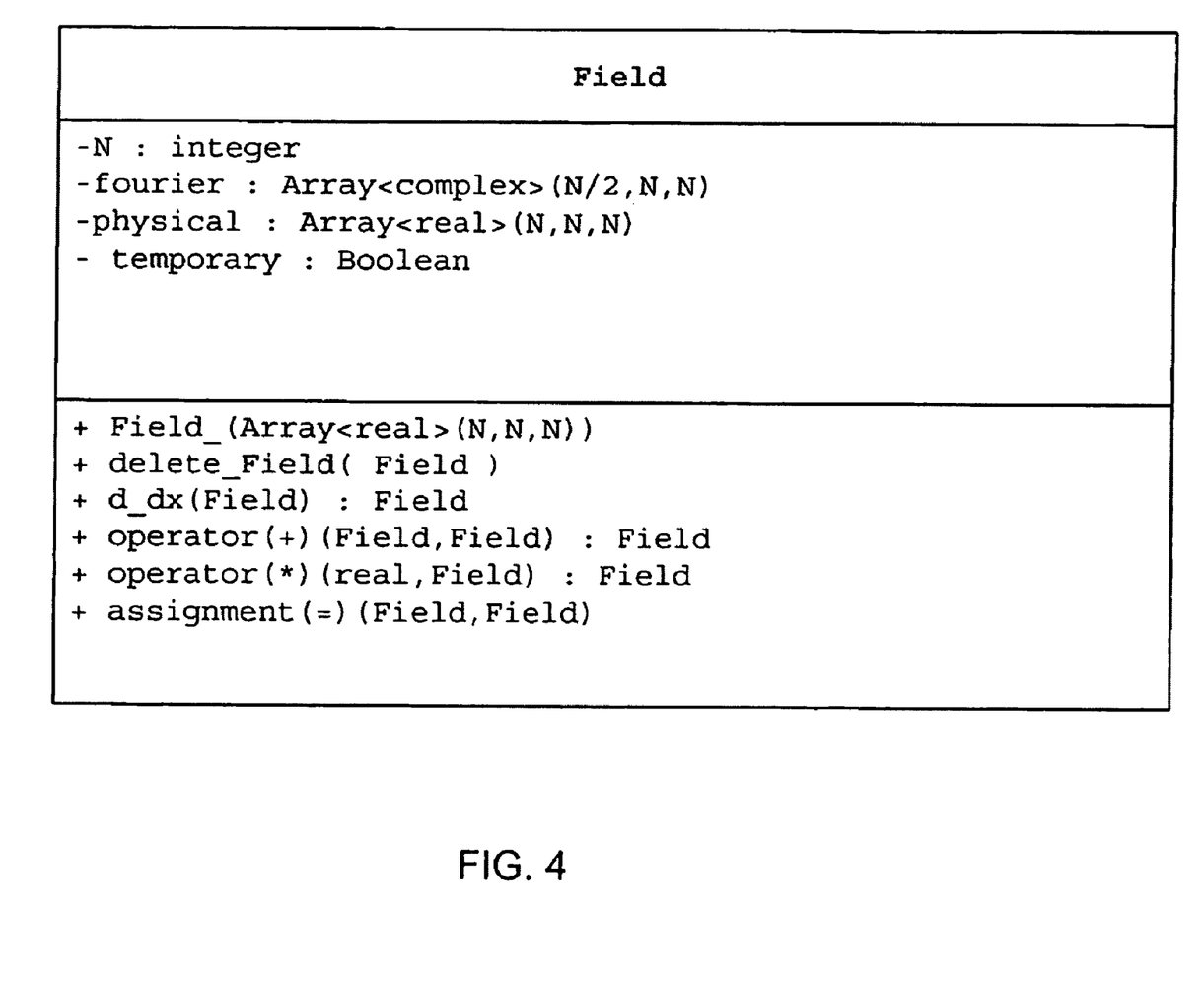
FIG. 4 is an example of field class arithmetic and differential operators.

FIG. 4 details several operators of interest. These include unary operators such as d_dx( ), binary operators such as OPERATOR(+) and a defined assignment ASSIGNMENT (=). The behavior of such operators is constrained using the four memory management rules listed above. The Definition and Corollary are modeled by including a Boolean temporary attribute in the Field object interface (see FIG. 1). The value of this attribute classifies the object in the set of objects defined by the Definition or in the complementary set defined by the Corollary.

In formal methods, constraints take three forms: preconditions that must be true before a procedure starts, postconditions that must be true after it ends, and invariants that must be true throughout its execution. Rule 1 is specified through postconditions on the arithmetic and differential operators. The contexts for OCL pre- and postconditions are always operations or methods. In OCL, one writes the constraint context above the constraint. Thus, OCL post conditions are written in the following form:

context:    Field::
       field_plus_field (left:  Field, right:    Field) total:    Field
    Post:   total.temporary = true where the text following "context:" provides the class name followed by the operator signature, including the operator name, its argument names and types, and its result name and type. The postcondition following the above "post:" label stipulates that all results returned by field_plus_field( ) must be classified as temporary. The corresponding constraint for unary operators takes the same form.

Rule 2 governs the left-hand arguments to defined assignments:
    context: Field:: assignment (=)(left: Filed, right: Field)
    post: left.temporary = false Although there is no explicit result passed by a defined assignment (Fortran 95 and Fortran 2003 require a defined assignment to be a SUBROUTINE), the implicit result is the left-hand argument, which is passed by reference and modified to contain a copy of the right-hand argument. The latter postcondition specifies that left must be persistent.

Rule 3 governs the deletion of temporary objects. It applies to all operators, including unary and binary ones, along with defined assignments. As applied to the unary operator d_dx, the corresponding formal constraint takes the form context:Field::d_dx(s:Field,direction:Integer)ds_dx:

Field post: s.temporary implies not s. allocated( )

Although d_dx( ) takes two arguments, it is referred to as a unary operator because the second argument simply determines the coordinate direction in which the first argument will be differentiated. Predicate calculus stipulates that the latter postcondition evaluates to true if the expression after the "implies" operator is true whenever the expression before "implies" operator is true. The constraint also evaluates to true whenever the expression before the "implies" operator is false.

Rule 4 governs the deletion of persistent objects. Only defined assignments create persistent objects. Since all Field operators have access to private Field components, they can make direct assignments to those components. Field operators therefore do not call the defined assignment procedure, so most persistent Field objects are created outside the Field class. An example occurs inside the third-order, Runge-Kutta time-advancement method, RK3_integrate, of the Integrand class in FIG. 1. As described by RMX, Integrand is a polymorphic class that uses dynamic dispatching to integrate instances of various classes from some time $t_n$ to some time $t_{n+1}=t_n+\Delta t$. The Integrand argument passed into RK3_integrate effectively represents a virtual object whose actual type is determined at run time.

During execution, RK3_Integrate( ) instantiates several temporary instances of whatever class of object it receives.

Two such instances contain the state variables at the end of the two intermediate Runge-Kutta substeps. Given an Integrand T containing a Scalar temperature field, the two intermediate instances are typically referred to as T' and T", or alternatively, Tp and Tpp. To write constraints on these objects, they are modeled as attributes of the Integrand class—although they are actually implemented as local variables in RK3_Integrate( ) since they are not currently used by other time advancement methods within the Integrand class.

To formalize Rule 4, invariant constraints on the persistence of Tp and Tpp are specified. For OCL invariants, the context is always a class, an interface, or a type. For the Integrand class, we write ---
Context: Integrand
Tp.temporary = false
Tpp.temporary = false
---

Since RK3_Integrate instantiates these objects, the formal constraints corresponding to Rule 4 requires they be deleted upon termination of this procedure:

---
Context: Integrand :: RK3_Integrate (k: Integrand)
post: Tp.allocated ( ) = false
post: Tpp.allocated ( ) = false
---

Similar post conditions apply to any other integration procedures that use Tp and Tpp.

As valid OCL expressions, the above constraints are backed by a formal grammar defined in Extended Backus-Naur Form (EBNF). An EBNF grammar specifies the semantic structure of allowable statements in a formal language. The statements' meanings can therefore be communicated unambiguously as part of the UML design document. An additional advantage of formal methods is their ability to express statements that could not be written in an executable language. One example is the relationship between the Boolean expressions in the implies statement. Another is the fact that these constraints must be satisfied on the set of all instances of the class. Programs that run on finite state machines cannot express conditions on sets that must in theory be unbounded. An additional benefit is that the set theory and predicate logic behind formal methods facilitate proving additional desirable properties from the specified constraints. (Such proofs are most naturally developed by translating the constraints into a mathematical notation that is opaque to those who are not formal methods specialists. Since the non-specialists OCL targets coincide with our intended audience, proving additional properties mathematically would detract from our main purpose.) Finally, a more concrete benefit will be explained. After detailing the run-time checks inspired by the OCL pre- and postconditions.

The above rules can be refined to encourage more economical memory usage. For this purpose, consider again the function field_plus_field( ), which takes arguments left and right, return total and has the generic interface operator (+)]. We can ensure economical memory usage by specifying that temporary memory be recycled. To facilitate this, left, right, and total must be pointers. In Fortran 2003, this means adding the POINTER attribute to their declarations as follows:

---
FUNCTION field_plus_Field (left, right) RESULT (total)
TYPE (Field), POINTER, INTENT (IN) :: left, right
TYPE (Field), POINTER :: total
---

Since OCL does not have a pointer type, pointers are modeled as a UML association between two classes. Left, right and total are modeled as instances of a Field_Pointer class that exists solely for its association with the Field class. It is assumed here the Field_Pointer class implements the services of Fortran 95 and Fortran 2003 pointers, including an ASSOCIATED( ) method that returns a Boolean value specifying whether its first argument is associated with its second argument.

Figure 5:
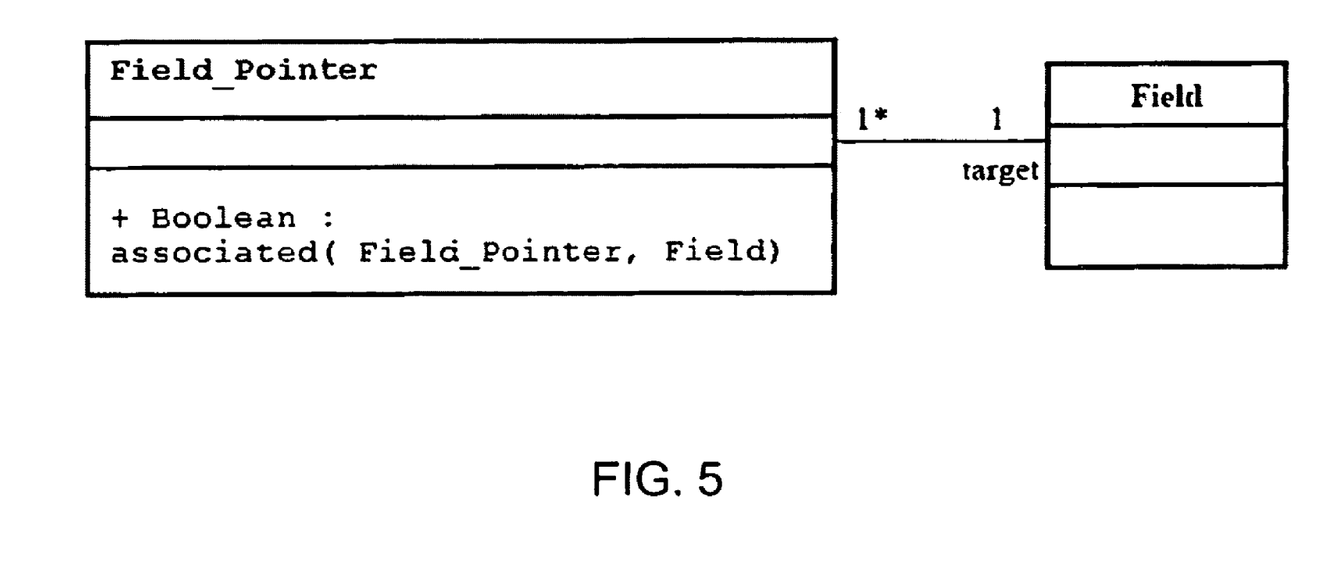
FIG. 5 is an example of a field class model, wherein numerical values indicate that one or more Field pointer instances can be associated with any one Field instance.

In FIG. 5, the label "target" is applied to the Field at the other end of the association. From a Field_pointer object, this association can be navigated through the OCL component selection operator ".", so an economical postcondition might be ---
context: Field::
    operator (+)(left: Field_Pointer, right: Field_Pointer)
    total: Field_Pointer
    post: left. target.temporary implies
        associated (total, left.target)
    post: ((not left. target.temporary) and
        right. target.temporary) implies
        associated (total, right.target)
--- where the implied conditions stipulate that total must be associated with one of the temporary targets. The programmer is assumed to have overwritten the corresponding temporary with the sum of left and right, but this part is omitted since the meaning of the sum is application-dependent. In an embodiment of the invention, all component real and integer variables and arrays are summed.

Reusing the entire temporary object is advised though not required, while giving its array component the ALLOCATABLE attribute, rather than the POINTER attribute. In Fortran 95 and Fortran 2003, an ALLOCATABLE array can be thought of as a limited type of pointer—one which can be associated with memory only through an ALLOCATE statement, not through target redirection or pointer arithmetic. This limitation has important performance benefits with optimizing compilers. ALLOCATABLE arrays are guaranteed to contain contiguous memory that can be accessed with unit stride; whereas a Fortran POINTER can target an array subsection that might not be contiguous. Any resulting lack of spatial locality could retard cache performance.

In an embodiment of the invention, a benefit of developing the economizing constraints relates to the conceptual leap required to model pointers in OCL. Prior to making that leap, expressing INTENT for POINTER arguments was thought not possible. The ability to do so is a Fortran 2003 feature not yet available in some compilers, and only very recently added to others. Developing the Field_Pointer class model inspired us to implement an analogous data structure that facilitated emulating pointer intent before it was available in compilers. This breakthrough enabled operator overloading. Without it, the above-mentioned hermeticity constraints would not be satisfied, unless an awkward syntax was used, such as described in RMX.

Fortran requires operator arguments to have the INTENT (IN) attribute, which precludes the deallocations necessary to ensure hermeticity with several current compilers. To circumvent this restriction, derived type expressions were evaluated by invoking procedures by name, while writing the operator syntax in an adjacent comment

```
TYPE (Field) :: left, right, total
! total = left + right
CALL assign (total, plus (left, right))
``` where assign and plus are aliases for field_equals_field and field_plus_field, respectively. To see the value of operator overloading, consider the RHS of Eq. (1), for which previous syntax was

```
TYPE (Field) :: dT__dt, T
CALL assign (dT__dt, &
  minus (times (1/alpha, &
  plus (d2__dx2 (T, 1), plus (d2__dx2 (T, 2),d2__dx2 (T, 3)))), &
  plus (times (u, d__dx (T, 1)), plus (times (T, d__dx(T, 2)), &
  times (w, d__dx (T, 3)))))
``` where ampersands indicate line continuation. The corresponding overloaded syntax is much closer to the form of differential equation being approximated:

$$dt\_dt=(1/alpha)*(d2\_dx2(T,1)+d2\_dx2(T,2)+d2\_dx2(T,3))\&-(u*d\_dx(T,1)+v*d\_dx(T,2)+w*d\_dx(T,3))$$

The overloaded syntax requires applying the INTENT(IN) attribute to a Field_Pointer object as follows:

```
TYPE Field __ Pointer
  TYPE (Field), POINTER :: target __field
END TYPE Field __ Pointer
FUNCTION field plus Field (left, right) RESULT (total)
  TYPE (Field Pointer), INTENT (IN) :: left, right
  TYPE (Field Pointer), :: total
```

This restricts changing with what target object the target field pointer is associated, while it allows one to DEALLOCATE the ALLOCATABLE array inside the target.

Although the above-described embodiments of the invention refer to Fortran 2003, it is to be understood that any programming language that, for example, permits operator overloading is within the scope of the invention. For example, an embodiment of the invention is implemented using C++.

Obviously, many modifications and variations of the present invention are possible in light of the above teachings without departing from the true scope and spirit of the invention. It is therefore to be understood that the scope of the invention should be determined by referring to the following appended claims.

What is claimed is:

1. A method of managing data in a data expression to be executed on a computer, the data expression including at least two overloaded operators and at least two objects, the at least two overloaded operators having at least two instructions, respectively, the at least two objects having at least two object data, respectively, the at least two objects including at least one original object and at least one resultant object, the at least two overloaded operators includes an assignment operator and a non-assignment operator, each assignment operator being capable of instructing the computer to assign a first of the at least two objects to a second of the at least two objects, each non-assignment operator being capable of instructing the computer to perform a mathematical operation on one of the at least two objects, each of the at least two overloaded operators being operable to map at least one of the at least two objects to a respective one of the at least one resultant objects, said method comprising:
   creating a data expression to be executed on a computer;
   tagging at least one of the at least two objects as temporary;
   executing a first non-assignment operator to instruct the computer to perform a mathematical operation on object data corresponding to the one of the at least two objects and thereby creating resultant object data corresponding to the one of the at least two objects;
   overwriting the object data corresponding to the one of the at least two objects with the resultant object data corresponding to the one of the at least two objects; and
   executing a first assignment operator to instruct the computer to assign the one of the at least two objects to the second of the at least two objects thereby copying correspondence of the resultant object data to the second of the at least two objects,
   wherein said overwriting is performed after said executing a first non-assignment operator and prior to said executing a first assignment operator.

2. The method according to claim 1, further comprising de-allocating memory corresponding to the object data that corresponds to the one of the at least two objects.

3. A method of managing data in a data expression to be executed on a computer, the data expression including at least two overloaded operators and at least two objects, the at least two overloaded operators having at least two instructions, respectively, the at least two objects having at least two object data, respectively, the at least two objects including at least one original object and at least one resultant object, the at least two overloaded operators includes an assignment operator and a non-assignment operator, each assignment operator being capable of instructing the computer to assign a first of the at least two objects to a second of the at least two objects, each non-assignment operator being capable of instructing the computer to perform a mathematical operation on one of the at least two objects, each of the at least two overloaded operators being operable to map at least one of the at least two objects to a respective one of the at least one resultant objects, said method comprising:
   creating a data expression to be executed on a computer;
   tagging at least one of the at least two objects as temporary;
   executing a first non-assignment operator to instruct the computer to perform a mathematical operation on object data corresponding to the one of the at least two objects and thereby creating resultant object data corresponding to the one of the at least two objects,
   de-allocating memory corresponding to the object data that corresponds to the one of the at least two objects; and
   executing a first assignment operator to instruct the computer to assign the one of the at least two objects to the second of the at least two objects thereby copying correspondence of the resultant object data to the second of the at least two objects,
   wherein said de-allocating is performed after said executing a first non-assignment operator and prior to said executing a first assignment operator.

* * * * *